United States Patent [19]

Ball

[11] Patent Number: 4,974,808
[45] Date of Patent: Dec. 4, 1990

[54] COMPUTER SUPPORT

[75] Inventor: Douglas C. Ball, Quebec, Canada

[73] Assignee: Haworth Sub, Inc., Holland, Mich.

[21] Appl. No.: 673,511

[22] Filed: Nov. 20, 1984

[51] Int. Cl.$^5$ .............................................. F16M 13/00
[52] U.S. Cl. .................................. 248/917; 248/639;
                                              248/220.1; 108/93
[58] Field of Search ............ 248/639, 152, 176, 220.1,
        248/225.31, 231.6, 235, 247; 108/64, 90, 92, 93,
                                                  59, 28, 102

[56] References Cited

U.S. PATENT DOCUMENTS

| | | | |
|---|---|---|---|
| 1,658,456 | 2/1928 | Meyer | 248/346 |
| 1,715,715 | 6/1929 | McVey | 248/220.1 |
| 2,147,539 | 2/1939 | Marchant | 248/220.1 |
| 2,713,530 | 7/1955 | Chisholm | 108/93 |
| 3,116,816 | 1/1964 | Johnson | 411/171 |
| 3,899,982 | 8/1975 | Fetzek | 108/93 |
| 4,482,063 | 11/1984 | Berke | 248/118 |
| 4,511,111 | 4/1985 | Godfrey | 248/459 |

FOREIGN PATENT DOCUMENTS

| | | | |
|---|---|---|---|
| 2920360 | 11/1980 | Fed. Rep. of Germany | 248/235 |
| 3019797 | 11/1981 | Fed. Rep. of Germany | 108/93 |
| 1148734 | 4/1969 | United Kingdom | 108/28 |

OTHER PUBLICATIONS

"IBM Technical Disclosure Bulletin", vol. 22, No. 7, Dec. 1979.

Primary Examiner—Ramon O. Ramirez
Assistant Examiner—Robert A. Olson
Attorney, Agent, or Firm—Renner, Otto, Boisselle & Sklar

[57] ABSTRACT

A corner mounting unit for a computer and like equipment quickly attaches to two adjoining surfaces at the same height. The mounting unit includes a frame having a slightly elevated plate with attachments positioned at selected locations whereby computer components or accessories may be positioned and firmly supported directly or indirectly at any of such variety of locations. A keyboard or bridging surface is captured by the frame and extends forwardly of the unit at a lower elevation and bridging the included angle between the adjoining surfaces. A separate adjustable keyboard may be employed. Also adjustable monitor turntables or swing arm attachments may be secured to the unit to position the computer components or accessories at the desired location for effective use. The unit eliminates the need for an expensive and complex intermediate or third top and the requisite hardware. A bridging clamp is provided at the intersection of the work surfaces so that the unit serves additionally to join, rigidify and stabilize such work surfaces.

11 Claims, 4 Drawing Sheets

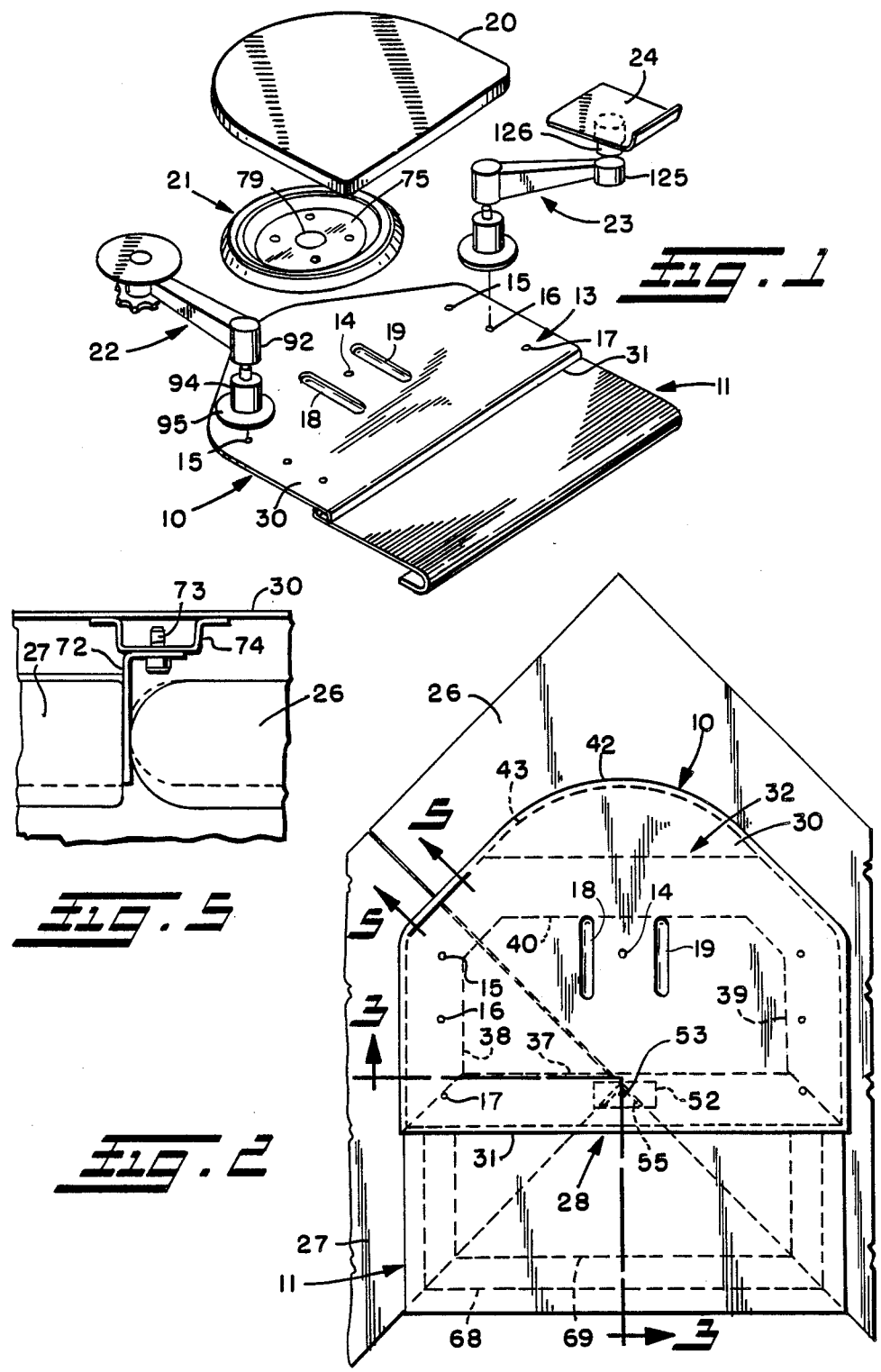

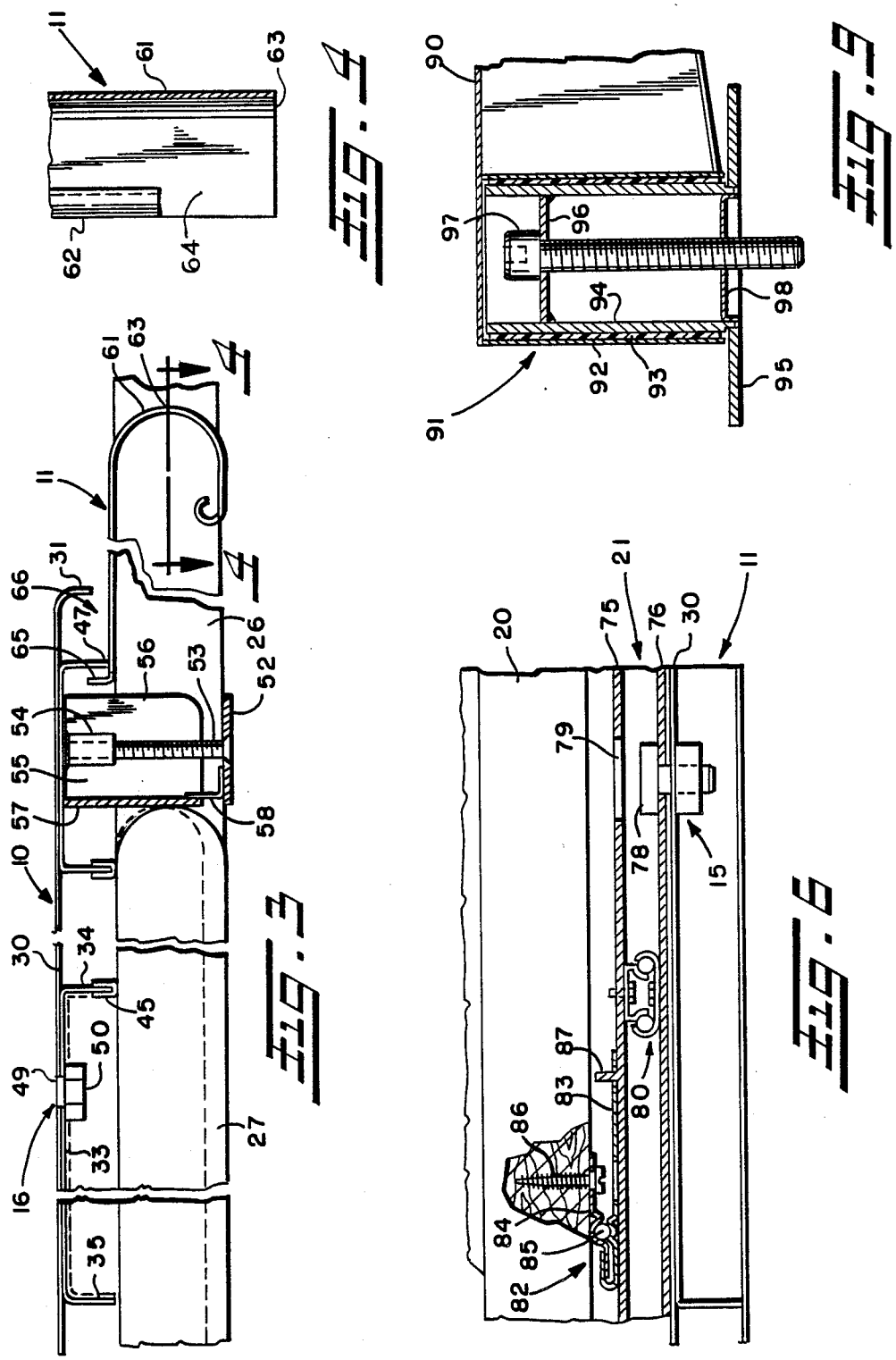

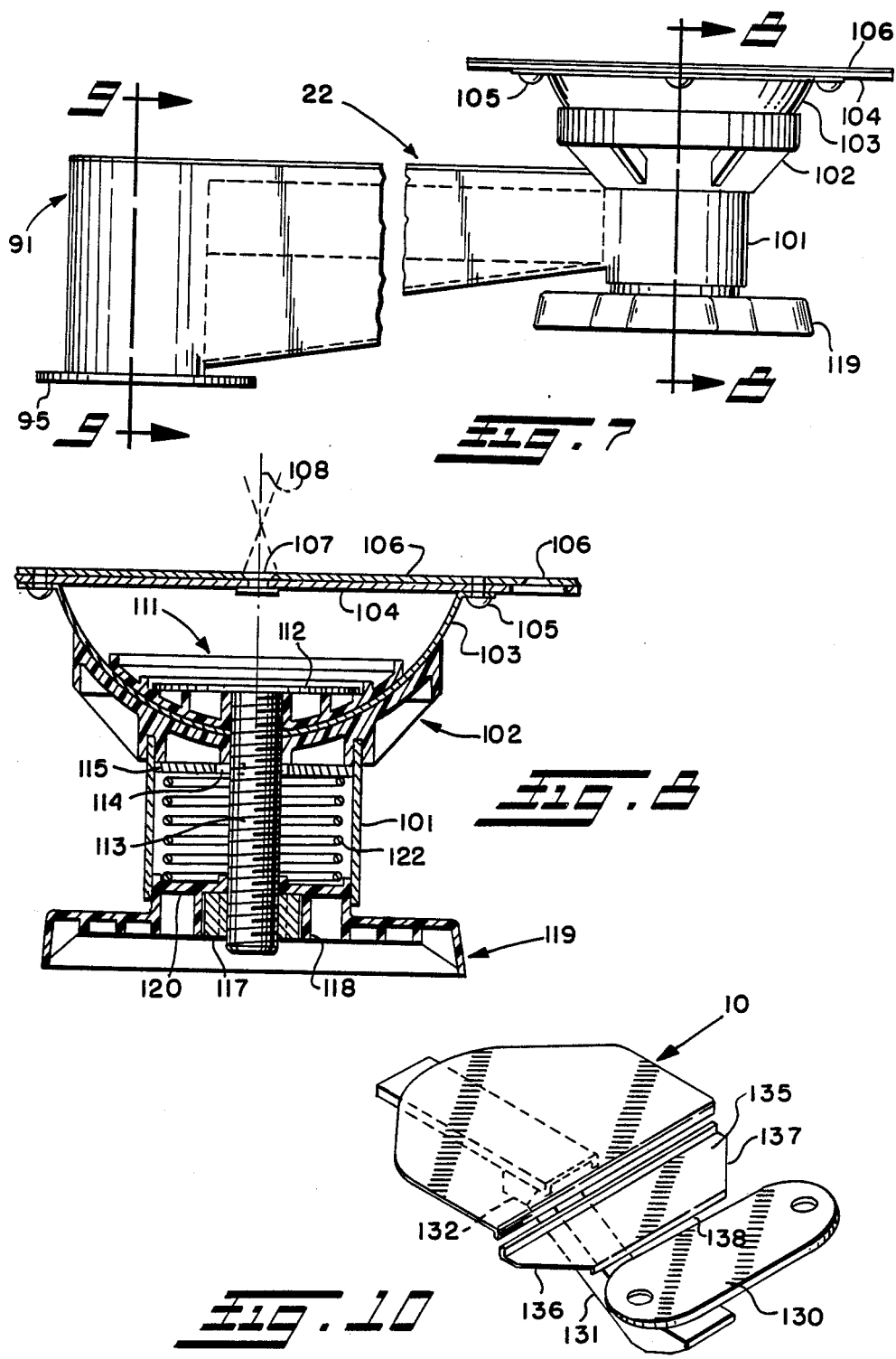

COMPUTER SUPPORT

DISCLOSURE

This invention relates generally as indicated to a computer support and more particularly to a corner mounting unit for computers, related equipment, and accessories.

BACKGROUND OF THE INVENTION

Computers and related equipment such as word processors are often positioned in a corner between two work surfaces extending at an angle, usually a right angle, to each other. This permits the operator access to both work surfaces as well as to the computer, the related equipment and certain accessories. To permit this there is often employed a third work top or a work surface between the angled work surfaces. This is an expensive proposition requiring not only a complex work surface, but also complex and expensive supporting and interconnecting hardware.

Some space divider systems for interior offices utilize interconnected beams from which work surfaces may be supported in cantilever or extending fashion. It is much easier and simpler to support these surfaces one against the other at the same height at juxtaposed or abutted conditions without providing intermediate or third tops and the associated hardware for corner computer installations.

It is desirable to provide a mounting unit for computers which can be positioned on one or more work surfaces at the same height and which will provide a slightly elevated mounting surface for a variety of computer or word processor components and related accessories, so that they can be firmly supported above the work surface at the desired elevation or position, while also providing a slightly lower forward tray for the keyboard or the like. Also, instead of providing a third top or surface at such corner which includes a fillet or bridging surface between the work surfaces, it is more economical to provide an accessory which includes not only the mounting unit for the computer and related accessories, but also which provides a fillet bridging the intersection of the work surfaces so that the operator may utilize readily both work surfaces and the corner positioned computer or like equipment. Moreover, it is desirable that the unit, when attached, serve additionally to join, rigidify and stabilize the adjacent work surfaces.

SUMMARY OF THE INVENTION

The present invention provides a relatively simplified unit which may be attached to corner forming work surfaces and which provides a mounting unit for a computer or like equipment so that such equipment and suitable accessories may be quickly attached thereto. The mounting unit includes a frame having a slightly elevated plate with attachments positioned at selected locations whereby computer components or accessories may be positioned and firmly supported directly or indirectly at any of such variety of locations. A keyboard or bridging surface is captured by the frame and extends forwardly of the unit at a lower elevation and serves to bridge the included angle between the adjoining work surfaces. A separate adjustable keyboard may be employed. Also, adjustable one or more monitor turntables or swing arm attachments may be secured to the unit to position the computer and components or accessories at the desired location for effective ergonomic use. The unit eliminates the need for an expensive and complex intermediate or third top and the requisite hardware. A bridging clamp is provided at the intersection of the work surfaces so that the unit serves additionally to join, rigidify and stabilize such work surfaces.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is an exploded view of one form of the present invention illustrating some of the computer or accessory supports which may be mounted thereon;

FIG. 2 is an enlarged top plan view of the unit as shown in FIG. 1 without the computer component or accessory supporting units mounted thereon;

FIG. 3 is a somewhat enlarged quarter section through the mounting unit as taken from the line 3—3 of FIG. 2;

FIG. 4 is a horizontal section of the leading edge of the keyboard tray or fillet unit as seen from the line 4—4 of FIG. 3;

FIG. 5 is an enlarged section taken substantially from the line 5—5 of FIG. 2;

FIG. 6 is a fragmentary transverse section through one form of turntable illustrating a mechanism for both the rotation and fore and aft movement;

FIG. 7 is a fragmentary side elevation of a swing arm which may be mounted on the mounting unit for supporting a monitor for both horizontal positioning and angular adjustment;

FIG. 8 is an enlarged transverse axial section taken substantially from the line 8—8 of FIG. 7;

FIG. 9 is a vertical axial section taken substantially on the line 9—9 of FIG. 7;

FIG. 10 is a view similar to FIG. 1 illustrating the employment of the unit with an adjustable keyboard;

DETAILED DESCRIPTION OF THE PREFERRED EMBODIMENTS

Figure 11:
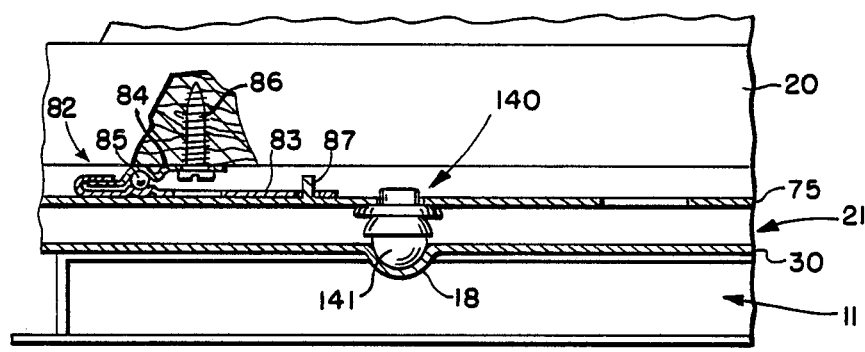
FIG. 11 is a view similar to FIG. 6 illustrating the turntable shown in FIG. 1 adapted to fit on stamped tracks in the top mounting unit.

Referring first to FIGS. 1 and 2 it will be seen that the computer support of the present invention comprises what may be termed a frame or base 10 and a keyboard surface 11 at a somewhat lower elevation. The frame or base is provided with attachments indicated generally at 13 positioned at selected locations whereby computer components or accessories may be positioned and firmly supported directly or indirectly at any of such variety of locations As indicated, there is one such attachment positioned in the center of the base as seen at 14 and three on each side of the base as seen at 15, 16 and 17, or seven altogether. Also, on each side of the center attachment 14 are parallel stamped depressions or tracks 18 and 19 enabling the turntable to move toward and away from the user.

FIG. 1 also illustrates by way of example some of the accessories which may be mounted on and fixed to the base by means of the attachments such, being a monitor or CRT support 20 which may be positioned on top of turntable 21 permitting the monitor support 20 not only to rotate but also to move toward and away from the user. Also illustrated is a swing arm monitor support 22 shown in greater detail in FIGS. 7, 8 and 9 which may be used also to support a screen or monitor either in lieu of the support 20 or in addition thereto. Also illustrated is a swing arm support 23 for a telephone pad 24, copyholder or like support.

As seen more clearly in FIGS. 2 and 3, the corner mounting unit is adapted to be supported for quick attachment to two adjoining work surfaces 26 and 27 which are at the same height. Such work surfaces may, for example, be supported in cantilever fashion from beams in a space divider system in the manner shown and illustrated in applicant's copending application, Ser. No. 081,437, filed Oct. 3, 1979, entitled "Space Divider System". Such system is marketed by SunarHauserman of Cleveland, Ohio, U.S.A. under the trademark RACE.

It is noted that the work surfaces may have rounded or rectangular edges and that the end edge of the work surface 27 abuts the front edge of the work surface 26 and forms a corner shown generally at 28 having an included angle of 90°. Although the work surface configuration illustrated is perhaps the most common, it will be appreciated that other corner configurations may be employed having different angles between the front edges of the work surfaces. Other common corner configurations are 120° and 130°. These are now normally closed with a five-sided third top which can be omitted and with the unit of the present invention bridging the area normally occupied by the third top.

The base unit 10 includes a top plate 30 having a downturned front edge 31. The underside of the planar top has secured thereto inverted channels or C-forms which includes top plates or webs 33 and downwardly extending inner and outer legs 34 and 35, respectively. The channel forms extend across the front of the base as seen at 37, along the sides of the base as seen at 38 and 39 and across the back of the base as seen at 40. A further channel extends between the front and back in the middle as seen at 41. Also, the top plate 30 at the back of the base is curved as indicated at 42 and a depending skirt 43 is provided slightly inwardly spaced from and concentric to the curvature of the top plate.

As seen more clearly in FIG. 3, the inner legs of the channel forms are edged with plastic extrusions 45 to protect the tops of the work surfaces. Such extrusions also serve to support the lower edge 47 of the front or outer leg of the front channel form slightly above the tops of the work surfaces as indicated.

Also as seen more clearly in FIG. 3, the attachment points 13 are provided by aligned holes 50 in the top plate and the web of the channels as seen at 49 with threaded receivers or nuts 50 welded to the underside of the channel in concentricity therewith.

The frame 10 may be clamped to the work surfaces at the juncture thereof by means of a rectangular clamp plate 52 which is supported by flush head fastener 53 which is threaded within the lug 54 secured to the underside at the center of the front channel form. Also secured at the center of such channel form is a V-shape locator 55 which includes depending walls 56 and 57 parallel to the front edges of the respective work surfaces 26 and 27. The clamp plate is also provided with a reference projection seen at 58 which simply assists in locating the clamping plate in the proper position as seen in FIG. 2 extending beneath both work surfaces at the crotch therebetween.

The keyboard tray 11 includes a top planar surface 60 with a rolled front edge 61 with the bottom inside edge curled as seen at 62. The curled bottom edge 62 does not extend to the lateral edge providing a flat undersurface 64 as seen in FIG. 4 at the corners such that the keyboard surface goes right around and underneath the work surface. In this manner, the front edge of the keyboard surface cannot lift up.

The back of the keyboard tray is provided with an upturned flange 65 which simply fits quite snugly beneath the edge 47 of the front leg of the front channel form. In this manner when the frame 10 is clamped or captured in position by the clamping plate 52 the keyboard tray is also clamped or secured in place. It is captured not only along the back edge, but also at the front corners by the part which fits beneath the work surfaces.

The space indicated at 66 between the downturned front edge of the top plate of the base provides a wire receiving chamber and the clearance between the downturned edge of the base top plate and the top of the keyboard tray provides wire access to that chamber. Also, as seen in FIG. 2, the size of the keyboard tray may vary with the keyboard tray illustrated in full lines being the largest and the same width as the base or frame. Somewhat smaller keyboard trays are indicated by the dotted lines 68 and 69.

As seen in FIG. 5, there is illustrated a removable locator clip 72 which may be secured by fastener 73 to bracket 74 on the underside of the overhanging edge of the top plate. The clip is simply a depending tab which is aligned with one wall of the V-shaped locator to assist in properly positioning the unit. A mounting for such a locator tab may be provided on both sides of the unit but will only be normally used on one side and only if required. The locator tab simply projects downwardly between the adjacent work surfaces to ensure the desired position.

Referring now to FIG. 6, it will be seen that one form of turntable 21 for supporting the video display terminal (VDT) support 20 comprises simply upper and lower plates 75 and 76 with the lower plate being secured to the base 11 at one of the lateral fastenings 15 by fastener 78 access to which is provided through pass-hole 79. The two annular plates are interconnected by roller tracks 80 so that the top plate may move fore and aft or toward and away from the user. The turntable is mounted on the top plate as indicated at 82 and includes a fixed lower portion 83 and a revolving upper portion 84 with turntable ball bearings being provided at 85. The upper portion is secured by fasteners 86 to the monitor support 20. A locating pin 87 is provided projecting upwardly from the top plate 75. In this manner the monitor or video screen is supported both for horizontal swinging movement about the vertical axis of the top plate while the entire unit may be moved toward and away from the viewer to the extent permitted by the roller tracks. The embodiment of FIG. 6 permits mounting one screen supporting surface in a lateral fastening or mounting hole, or two screen supporting surfaces each in lateral mounting holes and provides both rotational as well as back and forth movement.

Referring now to FIGS. 7, 8 and 9, there is illustrated the swing arm unit 22 which also may be used to support a video screen and which provides a greater range of horizontal adjustment as well as angular adjustment. The swing arm unit 22 includes a radially extending arm 90. The arm may be of tubular configuration provided with an interior gusset for torsional rigidity and at its inner end 91 is provided with a cylindrical downwardly extending tubular socket 92 which slides over a plastic spacer sleeve 93 which is mounted on the outside of a relatively heavy wall cylindrical capstan 94 projecting upwardly from annular base 95. The top of the capstan is provided with a mounting flange 96 through which headed bolt 97 passes, the flange being positioned to limit the penetration of the bolt below the base 95. The bolt also passes through a spacer 98. In this manner the bolt is used to secure firmly the capstan at a selected one of the fastenings, such as the fastening 15 seen in FIG. 1.

The outer end of the arm is secured to a cylindrical housing 101 which extends vertically and mounted on top of which is an outside or bottom plastic washer 102 which has a hemi-spherical top surface. Supported on top of the outside washer 102 is a hemi-spherical cup 103 which is secured to plate 104 by fasteners 105. The plate 104 is in turn secured to plate 106 by a flush head pin 107 which permits the plate 106 to rotate about the axis 108 of such pin. The plate 106 is in turn secured to the underside of the monitor support by flush head fasteners extending through holes indicated at 109.

Mounted on the inside of the cup 103 is an inner plastic washer 111 in which is seated the head 112 of T-bolt 113. The shank of the T-bolt is provided with a key way in which key 114 fits, such key being mounted on flange 115 secured to the cylindrical wall 101. At the lower end of the threaded shank there is provided a nut 117 captured in hexagonal housing 118 in molded handle 119. The handle includes a wall 120 closing the bottom of the cylindrical housing 101. A compression spring 122 extends between the flange 115 and the wall 120 of the handle. The spring generates a constant compression at any given setting of the handle and in this manner the cup 103 may be locked in a desired tilt position or released for readjustment and locked again. If the spring is adjusted properly the monitor support may be manually adjusted and it will stay in that position. The mechanism thus illustrated then permits the monitor support to be tilted universally from its vertical axis in a quick and convenient manner.

The swing arm support 23 seen in FIG. 1 may be constructed at its inner end in a similar manner as illustrated in FIG. 9 with its outer end simply being provided with a cup or sleeve into which downwardly projecting pintel 126 on the copyholder or pad 24 fits. In its simplified form the arm 23 swings about its proximal vertical axis. The pad or copyholder may also swing about its vertical distal axis.

Referring now to FIG. 10 there is illustrated the computer corner unit of the present invention utilized with adjustable keyboard 130. The keyboard 130 is mounted on arm 131 which is in turn mounted on commercially available adjustment mechanism indicated generally at 132 which may be supported beneath the corner work tops. The unit 10 is the same as heretofore illustrated and described and the bridging surface 135 is similar to the bridging surface 10 and is provided with cropped or angled lateral edges 136 and 137 which in turn places the rolled leading edge 138 closer to the corner providing more room for the adjustable keyboard tray 130.

Figure 12:
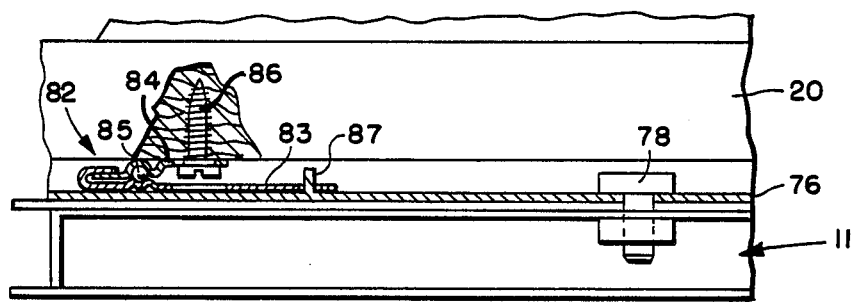
FIG. 12 is a view similar to FIGS. 11 and 6 illustrating a more simplified turntable which rotates only.

Referring now to FIGS. 11 and 12, there is illustrated two additional embodiments of a turntable screen support. The embodiment of FIG. 11 is essentially that shown in FIG. 1 and utilizes four ball casters shown generally at 140 mounted on plate 75 with the balls 141 of an aligned pair riding in stamped track 18. The other aligned pair rides in track 19. The turntable simply sits in the tracks 18 and 19 and remains there of its own weight. This configuration is used to mount one screen surface to the centerline position and provides both rotational and back and forth movement. It may be employed whether the unit is used as a corner unit or simply positioned on top of any work surface.

In FIG. 12, the second plate 75 is omitted and the plate 76 directly supports the turntable. It is secured by fastener 78 either to a centerline or lateral position and provides no back and forth movement. This configuration permits one screen position in the center or one or two at lateral positions.

It can now be appreciated that the unit may be placed in a wide variety of positions and utilization of a number of components or accessories can be made with the present invention. For example, two side-by side turntables may be mounted on the unit using the lateral attachments. Also, the unit 10 may be positioned on essentially any work surface other than the corner configuration shown without the captured keyboard or bridging surface, simply to support in a convenient fashion computer components or accessories.

I claim:

1. A corner mounting unit for computer and like equipment adapted to be positioned at the juncture of adjoining work surfaces extending at an angle to each other, said mounting unit comprising a frame having elevated top surfaces means for extending horizontally over both such work surfaces, mounting means in said frame for fastening thereto at selected locations thereon a variety of computer or computer related equipment, and bridging plate mans adapted to be held by said frame for extending forwardly of said frame and between the edges of the work surfaces at an inner corner therebetween, said frame including a depending flange along a forward portion thereof, and said bridging plate means including an upturned flange along its rear edge adapted to be captured behind said depending flange when said bridging plate means is held in position by said frame.

2. A mounting unit as set forth in claim 1 in combination with said work surfaces.

3. A mounting unit as set forth in claim 1 wherein said bridging plate means includes downturned forward edge means for forming substantially a corner fillet continuation of the forward edges of the adjoining work surfaces.

4. A mounting unit as set forth in claim 1 including clamp means to clamp said frame to the adjoining work surfaces and thereby clamp and capture said bridging plate means with said depending flange.

5. A mounting unit for computer and like equipment adapted to be positioned on a work surface, said mounting unit comprising a frame adapted at its underside to rest atop the work surface adjacent a front edge thereof and having elevated top surface means for extending horizontally over such work surface, and clamp means at the front of said frame for clamping said frame to the work surface adjacent the front edge of the work surface, and horizontal support means for extending forwardly of said frame and front edge of such work surface to provide a support surface forwardly of said frame and the work surface, said horizontal support means having a rearward portion adapted to be captured between said mounting frame and such work surface when said frame is clamped to such work surface by said clamp means.

6. A mounting unit as set forth in claim 5 wherein said frame includes a depending forward flange and said horizontal support means includes an upturned rearward flange adapted to be captured behind said depending forward flange.

7. A mounting unit as set forth in claim 5 wherein said frame includes threaded mounting means accessible at said top surface means for fastening thereto at selected locations thereon a variety of computer or computer related equipment.

8. A mounting unit as set forth in claim 5 in combination with said work surface.

9. A mounting unit for computer and like equipment adapted to be positioned at the juncture of adjoining work surfaces, said mounting unit comprising a frame adapted at its underside to rest atop both work surfaces at the juncture thereof and having elevated top surface means for extending horizontally over both such work surfaces adjacent an inner corner therebetween, and a bridging plate adapted to extend between the front edges of the work surfaces and to be held in position by said frame, said bridging plate having capture means at the front corners thereof for engaging the front edges of the work surfaces in captured relationship.

10. A mounting unit as set forth in claim 9 in combination with said work surfaces.

11. A corner mounting unit for computer and like equipment adapted to be positioned at the juncture of adjoining work surfaces extending at an angle to each other, said mounting unit comprising a frame having elevated top surface means for extending horizontally over both such work surfaces, mounting means in said frame for fastening thereto at selected locations thereon a variety of computer or computer related equipment, and bridging plate means adapted to be held by said frame for extending forwardly of said frame and between the edges of the work surfaces at an inner corner therebetween, said frame including a depending flange along a forward portion thereof, said bridging plate means including an upturned flange along its rear edge adapted to be captured behind said depending flange when said bridging plate means is held in position by said frame, said bridging plate means including downturned forward edge means for forming substantially a corner fillet continuation of the forward edges of the adjoining work surfaces, said top surface means of the frame extending forwardly and then downwardly at a forward portion thereof to form a wire receiving chamber in cooperation with said depending flange and a top surface of said bridging plate means, and said forward portion having a lower edge sufficiently spaced from the top surface of the bridging plate means to form a wire clearance.

* * * * *